US008829401B1

(12) United States Patent
Lutke et al.

(10) Patent No.: US 8,829,401 B1
(45) Date of Patent: Sep. 9, 2014

(54) PROJECTILE AND ASSOCIATED METHOD FOR SEEKING A TARGET IDENTIFIED BY LASER DESIGNATION

(75) Inventors: Kevin Lutke, Huntington Beach, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 593 days.

(21) Appl. No.: 13/162,167

(22) Filed: Jun. 16, 2011

(51) Int. Cl.
*F42B 15/01* (2006.01)
*F41G 7/00* (2006.01)
*B64D 7/08* (2006.01)
*F42B 15/00* (2006.01)

(52) U.S. Cl.
CPC .. *F42B 15/01* (2013.01); *B64D 7/08* (2013.01)
USPC ......... 244/3.19; 244/3.1; 244/3.11; 244/3.14; 244/3.15; 244/3.16; 244/3.21; 244/3.24; 89/1.11; 89/1.1; 102/501; 102/529; 701/1; 701/2; 701/3; 701/4; 701/400; 701/408; 701/468; 701/469

(58) Field of Classification Search
CPC .......... F41G 7/006; F41G 7/008; F41G 7/20; F41G 7/22; F41G 7/2206; F41G 7/2233; F41G 7/2246; F41G 7/2253; F41G 7/30; F41G 7/301; F41G 7/34; F42B 8/12; F42B 10/60; F42B 10/62; F42B 10/64; F42B 15/01; F42B 15/10; F42B 19/36
USPC ............ 244/3.1–3.3; 701/1–4, 400, 408, 468, 701/469, 500, 501; 342/356, 357.2, 357.21, 342/357.22, 357.23, 357.39, 357.395, 342/357.4, 357.52, 357.56, 350, 352, 342/357.25, 357.31, 357.36, 357.44; 89/1.1, 1.11; 102/382, 384, 473, 498, 102/501, 529
See application file for complete search history.

(56) References Cited

U.S. PATENT DOCUMENTS

| | | | | |
|---|---|---|---|---|
| 4,179,088 A | * | 12/1979 | French | 244/3.19 |
| 4,634,271 A | * | 1/1987 | Jano et al. | 244/3.13 |
| 4,726,224 A | * | 2/1988 | D'Ausilio | 244/3.15 |
| 4,741,245 A | * | 5/1988 | Malone | 342/357.36 |
| 5,007,736 A | * | 4/1991 | Daniel et al. | 244/3.16 |

(Continued)

OTHER PUBLICATIONS

Tests prove laser JDAM accuracy on moving targets [online] [retrieved May 5, 2011]. Retrieved from the Internet: <URL: http//www.flightglobal.com/articles/article.aspx?liArticleID=356181&PrinterFriendly=true>. (dated Mar. 5, 2011) 2 pages.

(Continued)

*Primary Examiner* — Bernarr Gregory
(74) *Attorney, Agent, or Firm* — Alston & Bird LLP

(57) ABSTRACT

A projectile and associated method are provided for seeking a target that has been laser designated even though the projectile does not include a laser receiver. A projectile includes an aerodynamic body and a GPS receiver configured to receive GPS signals indicative of a location of the aerodynamic body. The projectile also includes a radio receiver configured to receive radio signals from an offboard laser receiver that provide information relating to a location of the target based upon laser designation of the target. Further, the projectile includes a processor configured to direct flight of the aerodynamic body toward the target based upon the location of the aerodynamic body as determined from the GPS signals and the location of the target based upon the information provided by the offboard laser receiver.

20 Claims, 4 Drawing Sheets

(56) References Cited

U.S. PATENT DOCUMENTS

| | | | |
|---|---|---|---|
| 5,344,105 A * | 9/1994 | Youhanaie | 244/3.14 |
| 5,397,079 A * | 3/1995 | Strentz et al. | 244/3.2 |
| 5,554,994 A * | 9/1996 | Schneider | 244/3.19 |
| 5,657,947 A * | 8/1997 | Mayersak | 244/3.19 |
| 5,855,339 A * | 1/1999 | Mead et al. | 244/3.11 |
| 5,943,009 A * | 8/1999 | Abbott | 342/357.44 |
| 6,037,899 A * | 3/2000 | Weber | 342/357.36 |
| 6,069,584 A * | 5/2000 | Johnson | 342/357.22 |
| 6,237,496 B1 * | 5/2001 | Abbott | 102/384 |
| 6,388,611 B1 * | 5/2002 | Dillman | 342/357.31 |
| 6,564,146 B1 * | 5/2003 | Meyer et al. | 244/3.14 |
| 6,910,657 B2 * | 6/2005 | Schneider | 244/3.11 |
| 6,919,840 B2 * | 7/2005 | Friedrich et al. | 244/3.16 |
| 7,610,841 B2 | 11/2009 | Padan | |
| 7,728,264 B2 * | 6/2010 | De Sa et al. | 244/3.15 |
| 7,767,945 B2 * | 8/2010 | Williams | 244/3.16 |
| 7,964,831 B2 * | 6/2011 | Hurty | 244/3.11 |
| 8,033,221 B2 * | 10/2011 | Edwards | 244/3.16 |
| 8,089,033 B2 * | 1/2012 | Zank et al. | 244/3.1 |
| 8,205,536 B2 * | 6/2012 | Fisher | 89/1.11 |
| 8,260,478 B1 * | 9/2012 | Green et al. | 102/501 |
| 8,344,302 B1 * | 1/2013 | Murphy et al. | 244/3.16 |
| 2009/0100995 A1 * | 4/2009 | Fisher | 89/1.11 |

OTHER PUBLICATIONS

Paveway II Enhanced Laser Guided Training Round, The Warfighter's Only Source For Live-Fire Training, Lockheed Martin (2007), 2 pages.

* cited by examiner

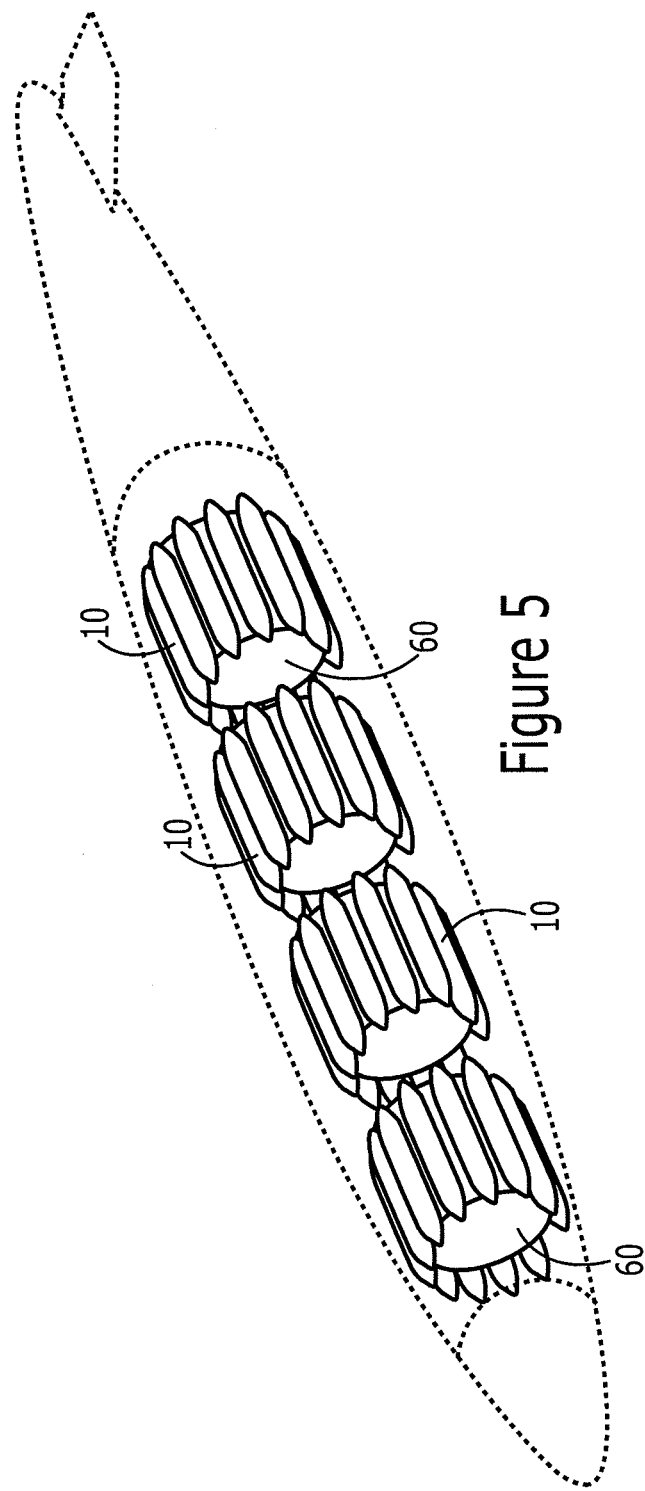

PROJECTILE AND ASSOCIATED METHOD FOR SEEKING A TARGET IDENTIFIED BY LASER DESIGNATION

TECHNICAL FIELD

Embodiments of the present disclosure relate generally to projectiles and, more particularly, to projectiles, such as practice stores, configured to seek a target identified by laser designation.

BACKGROUND

Aircraft are configured to carry a variety of stores that may be deployed during flight. These stores may include various types of projectiles that are intended to impact a predefined target. In order to train crew members in the deployment of the stores and/or to assess the performance of the aircraft, the stores or the like, practice stores may be carried by and deployed form an aircraft during a training flight. The practice stores are generally designed to mimic the performance of a corresponding store, such as in terms of its flight characteristics and/or targeting accuracy.

Since aircraft may carry and deploy a variety of different types of stores, there are also a variety of different types of practice stores, each of which mimics the performance of a respective store. In order to simulate the performance of various different stores, a number of different types of practice stores must be maintained in inventory since each practice store simulates a respective store. However, practice stores have not been designed for all types of stores, such as Global Positioning System (GPS) glide bombs, such as the Joint Direct Attack Munition (JDAM) or laser JDAM. Of the practice stores that are available, however, some practice stores may be configured to detect a target that has been designated or illuminated by a laser. In this regard, a laser designator may illuminate the target with a laser beam. The practice stores, such as Paveway II Enhanced Laser Training Rounds (E-LGTRs), may correspondingly include a laser receiver for detecting the laser designation of the target and determining the location of the target. The practice store may then be directed toward the target.

A practice store is generally destroyed or at least damaged upon impact with the target. As such, it is typically desirable to minimize the cost of a practice store while still configuring the store to appropriately mimic a conventional store since the practice store is not re-usable. However, the inclusion of a laser receiver having relatively high quality optical components within a practice store in order to detect a target that has been laser designated disadvantageously increases the cost of a practice store with the laser receiver generally being destroyed or damaged upon impact with the target.

Additionally, the costs associated with a training exercise involving the deployment of practice stores include the operational and maintenance costs of the aircraft. As a result of the size of the practice stores in some instances, an aircraft may carry only a single practice store or a relatively small number of practice stores and must therefore repeatedly land in order to take on additional practice stores during a training exercise that involves the deployment of multiple practice stores, thereby increasing the overall costs of the training exercise. Additionally, practice stores may be relatively heavy, thereby increasing the fuel and other operational costs for the training exercise.

BRIEF SUMMARY

A projectile, such as a practice store, and associated method are provided according to one embodiment of the present disclosure for seeking a target that has been laser designated even though the projectile does not include a laser receiver which otherwise would add materially to the cost of the projectile. For example, the projectile of one embodiment may simulate the flight of a respective type of projectile in a more cost effective manner. A multiple launch assembly is also provided according to another embodiment of the present disclosure to allow a launch platform, such as an aircraft, to carry a plurality of projectiles in such a manner as to have a form factor of a certified store and to launch a plurality of projectile during a single flight, thereby increasing the cost effectiveness of a training exercise.

In one embodiment, a projectile is provided that includes an aerodynamic body having positionable aerodynamic surfaces. The projectile also includes a Global Positioning System (GPS) receiver carried by the aerodynamic body and configured to receive GPS signals indicative of a location of the aerodynamic body. The projectile also includes a radio receiver carried by the aerodynamic body and configured to receive radio signals from an offboard laser receiver that provide information relating to a location of a target based upon laser designation of the target. Further, the projectile includes a processor carried by the aerodynamic body and configured to direct flight of the aerodynamic body toward the target based upon the location of the aerodynamic body as determined from the GPS signals and the location of the target based upon the information provided by the offboard laser receiver.

The radio receiver of one embodiment is also configured to receive radio signals from the offboard laser receiver that provide information relating to a time at which the location of the target was determined and a velocity, if any, of the target. The radio receiver of one embodiment is configured to repeatedly receive radio signals from the offboard laser receiver that provide information relating to the location of the target at different instances of time. In one embodiment, the practice store may also include an inertial measurement unit (IMU) configured to determine velocity and orientation of the aerodynamic body. In this embodiment, the processor is responsive to the IMU and is configured to direct flight of the aerodynamic body toward the target based also upon the velocity and orientation of the aerodynamic body as determined by the IMU.

In one embodiment, the processor is configured to direct flight of the aerodynamic body toward the target by controllably repositioning one or more of the positionable aerodynamic surfaces. Also, the positionable aerodynamic surfaces may be configurable prior to flight to simulate a respective one of a plurality of candidate stores. The processor of one embodiment is configured to operate in accordance with a respective one of a plurality of control laws with each control law configured to simulate flight of a different store.

In another embodiment, a method of directing a projectile toward a target is provided that includes receiving Global Positioning System (GPS) signals indicative of a location of the projectile while in flight and receiving radio signals from an offboard laser receiver that provide information relating to a location of the target based upon laser designation of the target. The method also directs flight of the projectile toward the target based upon the location of the projectile as determined from the GPS signals and the location of the target based upon the information provided by the offboard laser receiver.

In regards to receiving radio signals, the method may also receive radio signals from the offboard laser receiver that provide information relating to a time at which the location of the target was determined and a velocity, if any, of the target.

The method may repeatedly receive radio signals from the offboard laser receiver that provide information relating to the location of the target at different instances of time. The method of one embodiment may also determine velocity and orientation of the aerodynamic body. As such, directing flight of the practice store may include directing flight of the aerodynamic body toward the target based also upon the velocity and orientation of the aerodynamic body.

The projectile of one embodiment includes a plurality of positionable aerodynamic surfaces. As such, directing flight of the projectile toward the target may include controllably repositioning one or more of the positionable aerodynamic surfaces. Additionally or alternatively, the method may include configuring the positionable aerodynamic surfaces prior to flight to simulate a respective one of a plurality of candidate stores. The method of one embodiment may also direct flight of the projectile in accordance with a respective one of a plurality of control laws with each control law configured to simulate flight of a different store. In a further embodiment, a multiple launch assembly is provided that includes a plurality of projectiles and a plurality of racks configured to carry one or more projectiles. Each projectile may include a Global Positioning System (GPS) receiver configured to receive GPS signals indicative of a location of the projectile, a radio receiver configured to receive radio signals from an offboard laser receiver that provides information relating to a location of the target based upon laser designation of the target and a processor configured to direct flight of the projectile toward the target based upon the location of the projectile as determined from the GPS signals and the location of the target based upon the information provided by the offboard laser receiver. The racks are configured to individually launch respective ones of the projectiles. The plurality of racks and the projectiles carried thereby are configured to have a form factor of a certified store, such as an external fuel tank. In this regard, the certified store may have a predefined form factor with the plurality of racks and the projectiles carried thereby having a form factor that is the same as the predefined form factor of the certified store, thereby reducing testing time and costs. The plurality of racks may be positioned in a linear arrangement. The plurality of racks of one embodiment are indexable following launch of a projectile. The plurality of racks may include an ejection mechanism for launching a projectile.

In accordance with embodiments of the present disclosure, projectiles, such as practice rounds, are provided that can be responsive to the laser designation of a target without requiring an onboard laser receiver and the associated optical elements. As such, the cost of the practice round may be reduced relative to a comparable practice round that includes a laser receiver without compromising the performance of the practice round. Additionally, the features, functions and advantages that have been discussed may be achieved independently in various embodiments of the present disclosure and may be combined in yet other embodiments, further details of which may be seen with reference to the following description and drawings.

BRIEF DESCRIPTION OF THE SEVERAL VIEWS OF THE DRAWINGS

Figure 1:
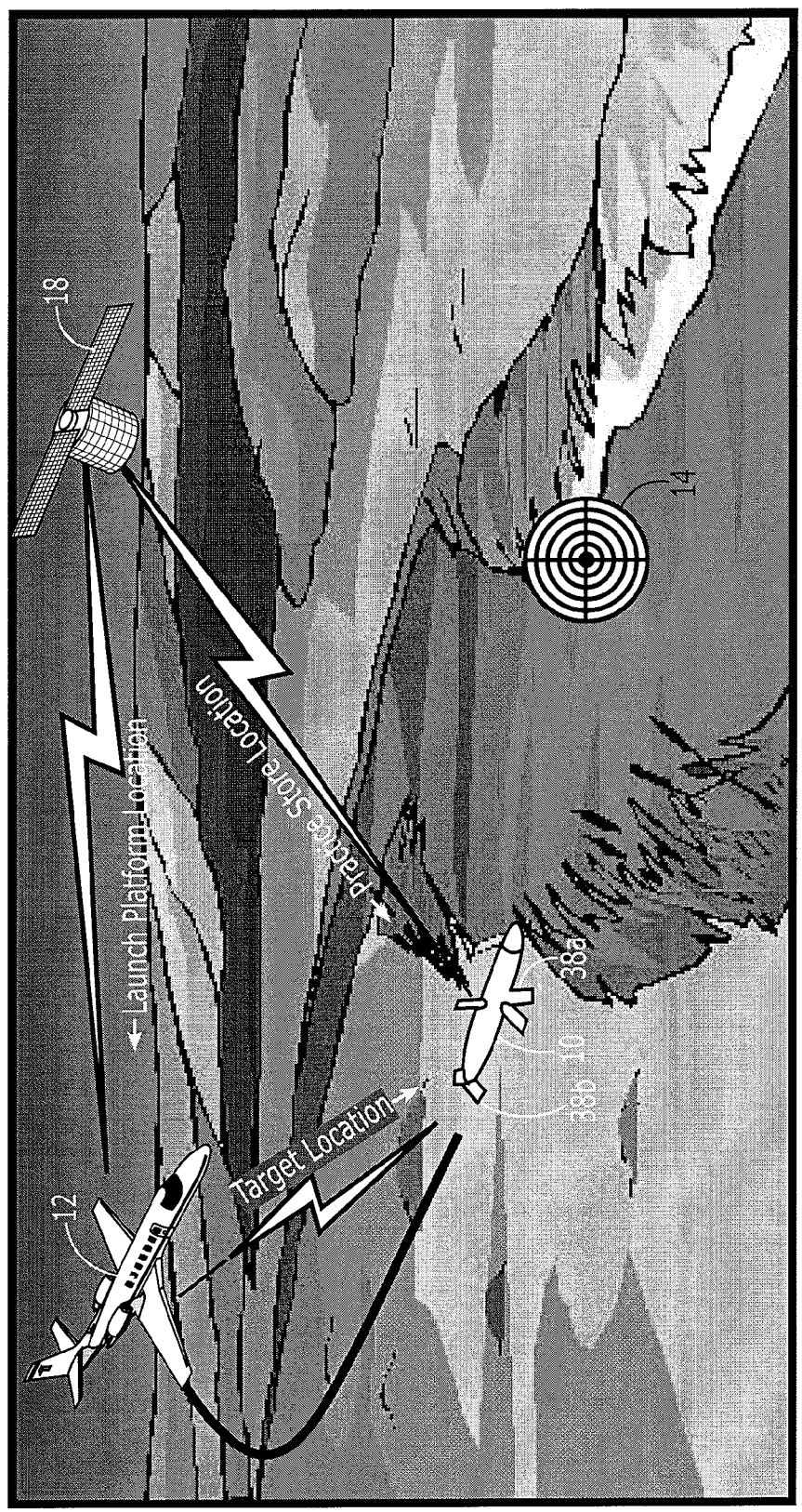
Figure 2:
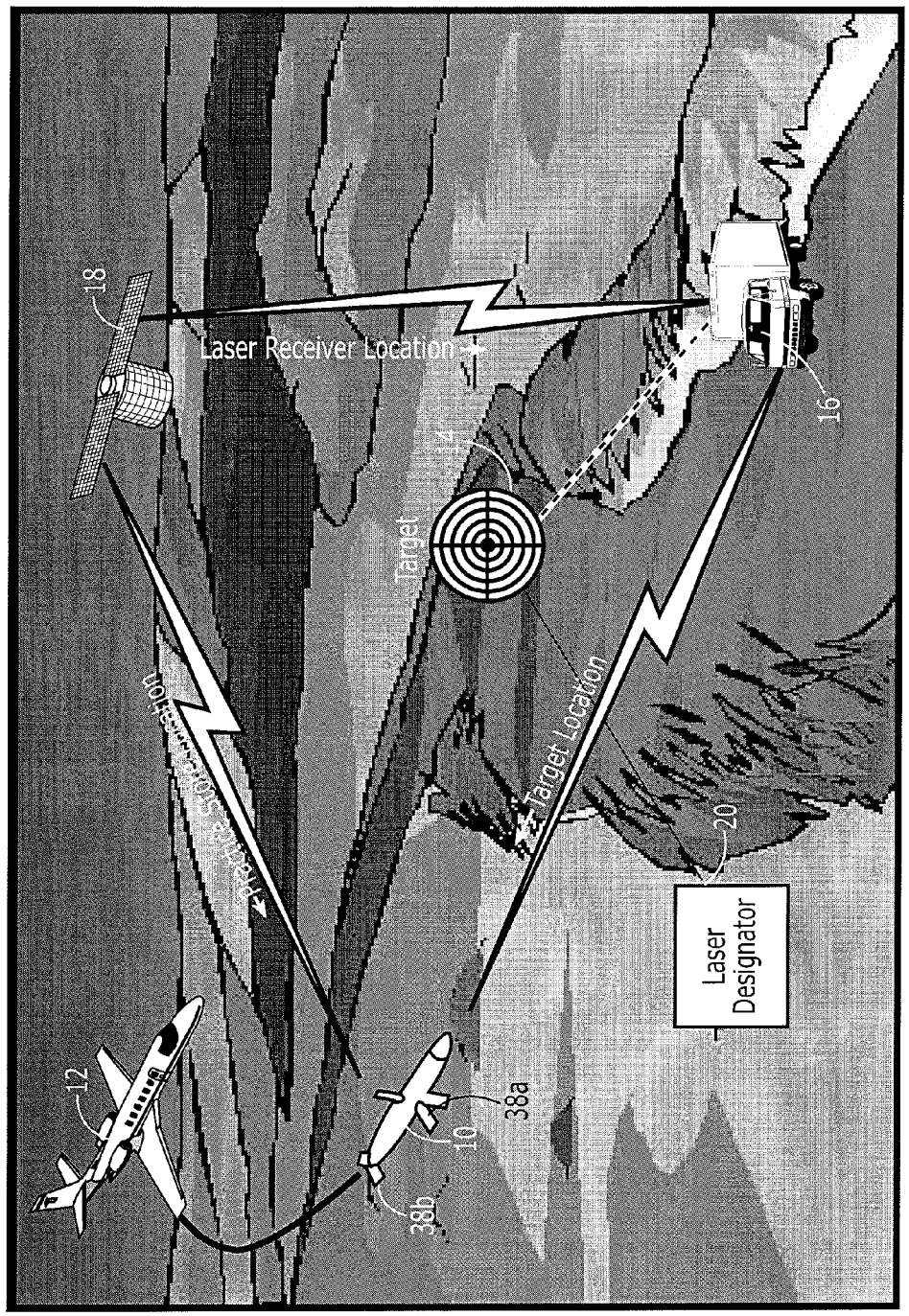
Figure 3:
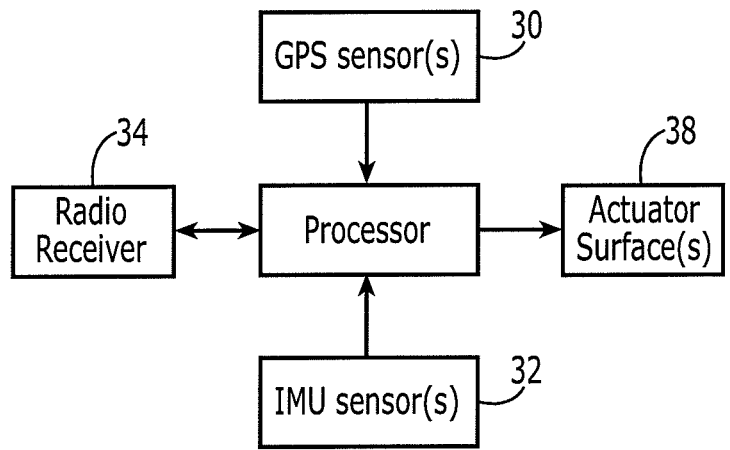
Figure 4:
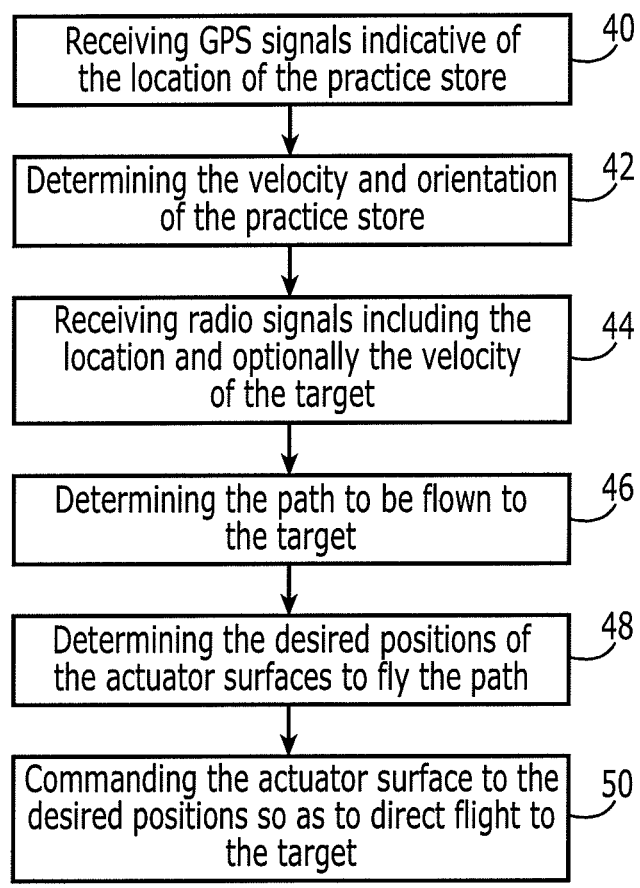

Having thus described embodiments of the present disclosure in general terms, reference will now be made to the accompanying drawings, which are not necessarily drawn to scale, and wherein:

FIG. 1 is a schematic representation of a system for guiding a projectile to a target at a predetermined location;

FIG. 2 is a schematic representation of a system for guiding a projectile, such as a practice store, toward a target that could be in motion in accordance with a method of one embodiment of the present disclosure;

FIG. 3 is a block diagram of a projectile in accordance with one embodiment to the present disclosure;

FIG. 4 is a flowchart of the operations performed in accordance with one embodiment of the present disclosure; and FIG. 5 is a graphical representation of a plurality of projectiles configured to have the same form factor as a certified store, such as an external fuel tank, in accordance with one example embodiment of the present disclosure.

DETAILED DESCRIPTION

The present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

A projectile 10, e.g., a store, a practice store such as a training round or the like, in accordance with embodiments of the present disclosure may be carried by and deployed or launched from an aircraft or other airborne launch platform 12. Once launched, the projectile is configured to be guided towards a target 14 in an effort to impact the target. The projectile may be directed to various types of targets, such as fixed targets positioned at predefined locations, moving targets, such as vehicles, e.g., a truck, tank or ship, or the like. In the embodiment of FIGS. 1 and 2, for example, the target may be a fixed target positioned at a predefined location on a target range. However, the target may, instead, be a moving target, such as an aerial target that is in flight and correspondingly has a location that changes over time. Alternatively, the moving target may be ground-based, such as a truck, tank, ship or other vehicle.

Prior to launch, the projectile 10 may be carried by and connected to the launch platform 12, such as via a communications link and/or an electrical interface. As such, the launch platform may provide the projectile with power and may perform various system checks upon the practice store prior to launch. As described below, the projectile may also include an inertial measurement unit (IMU) that includes one or more IMU sensors for determining the velocity and orientation of the projectile. As such, the launch platform may also initialize the IMU sensors of the projectile prior to the launch. Further the projectile may be configured to conduct a built-in test (BIT) to ensure proper operation including valid telemetry with an off-board laser receiver 16 as described below.

In the embodiment of FIG. 1 in which the target 14 is positioned at a predefined location, such as a predefined location on a target range, the location, e.g., coordinates of the target, may be provided to the launch platform 12 and, in turn, to the projectile 10. In addition to receiving the location of the target 14, the projectile 10 may be configured to receive signals indicative of its location. In this regard, the projectile may receive GPS signals from a GPS system including a constellation of GPS satellites 18, one of which is shown in FIG. 1. In addition to receiving signals indicative of its location, the projectile may be notified of the time at which its location was determined. This time value may be the actual time at which the location was determined or a reference time, such as may be received in conjunction with the GPS signals, that allows for synchronization as described below. As also shown in FIG. 1, the launch platform 12 may also receive signals, such as GPS signals, indicative of the location of the launch platform. Based upon the GPS signals as well as the signals from the IMU sensors, the projectile may determine its current location. Thereafter, based upon the location of the projectile and the location of the target 14, the projectile may also determine the configuration of the positionable aerodynamic surfaces, such as wings 38a and/or tailfins 38b, that is required for the projectile to fly to the target. Thus, the projectile may be configured to command the positionable aerodynamic surfaces to the desired configuration such that the projectile flies to the target.

Based upon the configuration of the positionable aerodynamic surfaces, the projectile 10 of the embodiment of FIG. 1 may emulate any of various glide weapons including, for example, a JDAM. In order to emulate a glide weapon with laser guidance, such as a Paveway II or a laser JDAM, the projectile may also be configured to communicate with an off-board laser receiver 16, such as via a wireless communications link, e.g., via radio signals. In this embodiment shown, for example, in FIG. 2, the projectile may again be configured to receive signals indicative of its location, such as by receiving GPS signals. In addition, the projectile of this embodiment may receive signals indicative of the location of the target 14 from the off-board laser receiver. In the method of FIG. 2, the system may also include a laser designator 20. The laser designator is configured to illuminate the target, such as by directing laser signals that impinge upon the target. While the laser designator is shown in the embodiment of FIG. 2 to be hand held or otherwise manually positionable, the laser designator may be differently configured in other embodiments.

The off-board laser receiver 16 of this embodiment is configured to detect the location of the target 14. While the target is illuminated by laser signals, the laser receiver can determine the location of the target. The location of the target can then be provided to the practice store 10, such as via a wireless communications link, e.g., via radio signals, between the off-board laser receiver and the projectile. In this regard, the laser receiver may be configured to encrypt the location of the target prior to its transmission to the projectile. As such, the projectile of this embodiment may be correspondingly configured to decrypt the signals, including the location, prior to further processing the location information. While the laser receiver is shown in the embodiment of FIG. 2 to be mounted upon a mobile ground unit, e.g., a truck with a mast, so as to be relocatable, the laser receiver may be differently configured in other embodiments. For example, the laser receiver may be carried by any platform capable of maintaining a continuous and unobstructed line of sight to the target including the launch platform 12, a separate fixed or rotary wing aircraft or the laser designator 20 having a GPS receiver, compass and laser seeker capable of providing information regarding both direction and distance to the target. In an instance in which the laser receiver is movable, the laser receiver may also receive GPS signals indicative of the location of the laser receiver, as shown in FIG. 2.

In an instance in which the target 14 is moving such that its location changes over time, the off-board laser receiver 16 may also be configured to determine the time at which the location of the target was determined. While the time may be the actual time at which the location of the target was determined, the time may alternatively be a reference time that permits the time at which the location of the target was determined to be synchronized with the time frame of the projectile 10, that is with the time at which the location of the projectile was determined. In the embodiment in which both the laser receiver and the projectile receive GPS signals, for example, the reference time provided by the GPS system along with the GPS signals may be utilized as the time according to which the measurements of the positions of the target and the practice store are synchronized.

Additionally, the off-board laser receiver 16 of one embodiment may be configured to determine the velocity, e.g., both speed and direction, at which the target 14 is moving at the time at which the location of the target is determined. The laser receiver of this embodiment may be further configured to transmit the time and velocity information to the projectile 10, such as via a wireless communications link, e.g., via radio signals. As noted above, the time and velocity information may be transmitted in various manners, but the off-board laser receiver of one embodiment is configured to encrypt the signals prior to transmission such that the projectile of this embodiment must correspondingly decrypt the signals prior to further signal processing.

Based upon the location of the projectile 10 and the location of the target 14 and, in some embodiments, the time and velocity information provided by the off-board laser receiver 16, the projectile may be configured to determine a path to be flown so as to impact the target. As described below, the projectile may also be configured to thereafter control the positionable aerodynamic surfaces such that the projectile flies along the path toward the target.

In one embodiment, the projectile 10 may receive a single report of the location and velocity, if any, of the target 14 from the off-board laser receiver 16 and the projectile may then determine the appropriate flight path to govern subsequent flight towards the target based upon this single report. In other embodiments, however, the off-board laser receiver may repeatedly determine the location and velocity of the target and may provide a series of reports to the projectile of the location and velocity of the target at different instances in time. Additionally, the projectile may repeatedly receive signals, such as from a plurality of GPS satellites 18 of its location. As such, the projectile of this embodiment may repeatedly update its determination of the path to be flown to the target and the commanded position of the positionable aerodynamic surfaces based upon the most recent report of the location and velocity of the target from the off-board laser receiver and the most recent information regarding the position of the projectile.

While the projectile 10 may be configured to determine the path along which the projectile is to fly toward the target 14 in the manner described above, the off-board laser receiver 16 of another embodiment may be provided with a time-stamped location and velocity of the projectile, such as based upon information provided by the projectile, such that the off-board laser receiver can determine the path to be flown to the target. In this embodiment, the off-board laser receiver may be configured to transmit the path to the projectile, such as via a wireless, e.g., radio, link. The projectile may then command the positionable aerodynamic surfaces based upon the definition of path provided by the laser receiver.

By utilizing an off-board laser receiver 16 that is configured to communicate with the projectile 10 via a wireless, e.g., radio, link, the projectile need not include a laser receiver including the relatively expensive optics. Thus, the cost of the projectile may be reduced which is of particular importance in those instances in which the projectile is a practice store that is likely to be destroyed or at least damaged upon impact with the target 14. Moreover, the cost effectiveness of the system is further improved since the laser receiver may be re-used with a plurality of different projectiles, such as practice stores.

Although the projectile 10 may be configured in different manners, the projectile of one embodiment includes an aerodynamic body that carries each of the components shown in FIG. 3 by way of example. In this embodiment, the projectile includes GPS sensor(s) 30 for receiving GPS signals providing information regarding the location of the projectile. See operation 40 of FIG. 4. Additionally, the projectile of this embodiment includes IMU sensor(s) 32 for determining the velocity and orientation of the projectile, thereby at least partially overcoming the lag in the target position data. See operation 42 of FIG. 4. Further, the projectile of this embodiment includes a radio or other wireless communication receiver 34 for receiving radio signals from the off-board laser receiver 16. The radio signals may provide information regarding the location of the target 14 and, in one embodiment, associated time and velocity information. See operation 44 of FIG. 4.

The projectile 10 of the illustrated embodiment also includes a processor 36. In this regard, the processor may include specifically configured processing circuitry, which may be comprised by a computer or the like. In addition to the processor, the computer of one embodiment may include a non-volatile, tangible memory storing data and computer program instructions configured to be executed by the processor so as to specifically configure the processor in accordance with embodiments of the present disclosure. The processor of one embodiment is configured to determine the path to be taken by the projectile so as to impact the target 14. See operation 46 of FIG. 4. Based upon the position of the projectile, as determined from the GPS signals, and the position and velocity of the target as provided by the off-board laser receiver 16, the processor may determine the path to be flown to the target after taking into account the respective times at which the location of the projectile and target were determined. The projectile of this embodiment also includes one or more positionable aerodynamic surfaces 38, such as one or more wings 38*a* and/or tailfins 38*b*, extending outwardly from the aerodynamic body. As such, the processor is also configured to determine the desired positions of the positionable aerodynamic surfaces to cause flight to the target and to then command the positionable aerodynamic surfaces, such as via respective actuators, to the desired positions, thereby controllably positioning the actuator surfaces such that the projectile will fly toward the target in a controlled fashion. See operations 48 and 50 of FIG. 4.

The projectile 10 may be carried by and launched from a launch platform 12 in various manners. In order to increase the cost effectiveness with which the projectiles are deployed, however, the launch platform may carry a plurality of projectiles and may be configured to individually launch each of the projectiles, such as each of a plurality of practice stores, during a single training mission. As such, the launch platform of this embodiment may be considered a multiple launch assembly. While the plurality of projectiles may be carried by the launch platform in various manners, the plurality of projectiles are carried by a launch platform of one embodiment such that the plurality of projectiles as a group in combination with the launch assembly have a form factor as defined by the outer mold line that is substantially similar and, in one embodiment, identical to that of a certified store, such as an external fuel tank, e.g., an AV-8B 300 gallon drop tank, as shown in FIG. 5 in which the outline of an external fuel tank is shown with dashed lines for purposes of comparison. In this regard, the plurality of projectiles may be carried by the same portion of the launch platform that otherwise carries the certified store and in such a manner such that the plurality of projectiles as a group in combination with the launch assembly define a form factor that is similarly or identically shaped to that of the certified store. By configuring the plurality of projectiles as a group in combination with the launch assembly to have a similar or identical form factor to that of a certified store, the behavior of the launch platform while carrying the plurality of projectiles may be more predictable and, in an embodiment in which an aircraft serves as the launch platform, the certification of the aircraft may be facilitated, such as by reducing the testing time and costs.

In the illustrated embodiment, the plurality of projectiles 10 are carried by a plurality of racks, such as in a plurality of vertical racks or rotary launchers 60. In this regard, each rotary launcher carries a plurality of projectiles. Each rotary launcher may operate under control of the launch platform 12 and independently of the other rotary launchers. As such, an individual projectile may be launched from each different rotary launcher. Following launch of a projectile, the rotary launcher may then rotatably index such that another projectile may be in position to be launched. This process of launching a projectile and then indexing the rotary launcher may be repeated until each of the projectiles has been launched. The rotary launchers may include various types of ejection mechanisms for launching the practice stores, such as pneumatic ejection mechanisms, pyrotechnic ejection mechanisms, spring-based ejection mechanisms and the like. Each rotary launcher may include a single ejection mechanism such that the projectiles are rotated relative to and individually brought into operable engagement with the ejection mechanism. Alternatively, each rotary launcher may include a plurality of ejection mechanisms, one of which is associated and in operable engagement with a respective projectile.

In order to further improve the cost effectiveness of the projectiles 10, a practice store may be configured to have a plurality of positionable aerodynamic surfaces 38, such as wings 38*a* and/or tailfins 38*b*, that may be positioned in any one of a number of different positions so as to configure the practice store to mimic the behavior of different types of stores. Thus, a practice store may effectively mimic the behavior of a respective types of store by initially positioning the positionable aerodynamic surfaces in a manner that allows the flight characteristics of the practice store to be the same or substantially similar to that of the respective type of store. Although the positionable aerodynamic surfaces may be repositioned in various manners, the wings may be deployed in one embodiment to various degrees to match the different amounts of lift available to various stores, such as various bomb units (GBUs), e.g., GBU-12, GBU-38 and GBU-54 stores. Additionally or alternatively, the tailfins may be crowed, that is, deflected, to produce drag without a directional change, so as to achieve different lift-to-drag ratios and equivalent flight paths for different types of stores, such as the Paveway II and JDAM stores.

In addition to or instead of repositioning the positionable aerodynamic surfaces 28, the flight control software that is executed by the processor 36 of the projectile 10 may also be reconfigured in some embodiments in order to allow the projectile, such as a practice store, to fly in the same or substantially similar manner to a respective type of store. In this regard, the flight control software of one embodiment may implement a plurality of alternative\outer loop control laws intended to replicate the flight path of various stores including, for example, GBU-12, GBU-38 and GBU-54 stores, by selecting the applicable deformation of the positionable aerodynamic surfaces to mimic the flight path of the respective type of store. As such, a respective outer loop control law may be selected so as to represent the respective type of store. The outer loop control law may then take into account the current location of the projectile and the current location of the target 14 in the determination of the flight path (generally having 6 degrees of freedom (DOF)) to be flown to the target. The respective outer loop control law passes the flight path to an inner loop control law, which is the same regardless of the type of store. The inner loop control law receives the flight path (generally having 6 DOF) and translates the flight path into deflections or other deformation of the positionable aerodynamic surfaces that are required to fly in accordance with the flight path. By selecting and implementing an outer loop control law for a respective type of store, the flight control software of this embodiment may be configured to fly the practice store in the same manner as the respective type of store.

As such, the projectile 10 may be reconfigurable so as to match the flight path of various glide weapons by extending the wings 38a to various degrees for lift, crowing the tailfins 38b to a desired position to obtain the intended drag and/or modifying the flight control laws implemented by the processor 36 such that the projectile, such as a practice store, flies in a similar manner as a respective type of store that is being simulated. By being capable of simulating different types of stores, the practice store of one embodiment may further improve the cost effectiveness of the training system of embodiments of the present disclosure.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments described and that modifications and other embodiments are intended to be included within the scope of the appended claims. Although specific terms are employed herein, they are used in a generic and descriptive sense only and not for purposes of limitation.

That which is claimed:

1. A projectile comprising:
    an aerodynamic body having positionable aerodynamic surfaces;
    a Global Positioning System (GPS) receiver carried by the aerodynamic body and configured to receive GPS signals indicative of a location of the aerodynamic body;
    a radio receiver carried by the aerodynamic body and configured to receive radio signals from an offboard laser receiver that provide information relating to a location of a target based upon laser designation of the target; and
    a processor carried by the aerodynamic body and configured to direct flight of the aerodynamic body toward the target based upon the location of the aerodynamic body as determined from the GPS signals and the location of the target based upon the information provided by the offboard laser receiver.

2. A projectile according to claim 1 wherein the radio receiver is also configured to receive radio signals from the offboard laser receiver that provide information relating to a time at which the location of the target was determined and a velocity of the target.

3. A projectile according to claim 1 wherein the radio receiver is configured to repeatedly receive radio signals from the offboard laser receiver that provide information relating to the location of the target at different instances of time.

4. A projectile according to claim 1 further comprising an inertial measurement unit (IMU) configured to determine velocity and orientation of the aerodynamic body, wherein the processor is responsive to the IMU and is configured to direct flight of the aerodynamic body toward the target based also upon the velocity and orientation of the aerodynamic body as determined by the IMU.

5. A projectile according to claim 1 wherein the processor is configured to direct flight of the aerodynamic body toward the target by controllably repositioning one or more of the positionable aerodynamic surfaces.

6. A projectile according to claim 1 wherein the positionable aerodynamic surfaces are configurable prior to flight to simulate a respective one of a plurality of candidate stores.

7. A projectile according to claim 1 wherein the processor is configured to operate in accordance with a respective one of a plurality of control laws with each control law configured to simulate flight of a different type of projectile.

8. A method of directing a projectile toward a target, the method comprising:
    receiving Global Positioning System (GPS) signals indicative of a location of the projectile while in flight;
    receiving radio signals from an offboard laser receiver that provide information relating to a location of the target based upon laser designation of the target; and
    directing flight of the projectile toward the target based upon the location of the projectile as determined from the GPS signals and the location of the target based upon the information provided by the offboard laser receiver.

9. A method according to claim 8 wherein receiving radio signals comprises receiving radio signals from the offboard laser receiver that provide information relating to a time at which the location of the target was determined and a velocity of the target.

10. A method according to claim 8 wherein receiving radio signals comprises repeatedly receiving radio signals from the offboard laser receiver that provide information relating to the location of the target at different instances of time.

11. A method according to claim 8 further comprising determining velocity and orientation of the projectile, wherein directing flight of the projectile comprises directing flight of the projectile toward the target based also upon the velocity and orientation of the projectile.

12. A method according to claim 8 wherein the projectile comprises a plurality of positionable aerodynamic surfaces, and wherein directing flight of the projectile toward the target comprises controllably repositioning one or more of the positionable aerodynamic surfaces.

13. A method according to claim 8 wherein the projectile comprises a plurality of positionable aerodynamic surfaces, and wherein the method further comprises configuring the positionable aerodynamic surfaces prior to flight to simulate a respective one of a plurality of candidate stores.

14. A method according to claim 8 wherein directing flight of the projectile comprises directing flight of the projectile in accordance with a respective one of a plurality of control laws with each control law configured to simulate flight of a different store.

15. A multiple launch assembly comprising:
    a plurality of projectiles, each projectile comprising a Global Positioning System (GPS) receiver configured to receive GPS signals indicative of a location of the projectile, a radio receiver configured to receive radio signals from an offboard laser receiver that provide information relating to a location of a target based upon laser designation of the target, and a processor configured to direct flight of the projectile toward the target based upon the location of the projectile as determined from the GPS signals and the location of the target based upon the information provided by the offboard laser receiver; and a plurality of racks configured to carry one or more projectiles, wherein the racks are configured to individually launch respective ones of the projectiles, wherein the plurality of racks and the projectiles carried thereby are configured to have a form factor of a certified store.

16. A multiple launch assembly of claim 15 wherein the certified store has a predefined form factor, and wherein the plurality of racks and the projectiles carried thereby have a form factor that is the same as the predefined form factor of the certified store.

17. A multiple launch assembly of claim 15 wherein the plurality of racks are positioned in a linear arrangement.

18. A multiple launch assembly of claim 15 wherein the plurality of racks are indexable following launch of a projectile.

19. A multiple launch assembly of claim 15 wherein the plurality of racks comprise an ejection mechanism for launching a projectile.

20. A multiple launch assembly of claim 15 wherein the certified store comprises an external fuel tank.

* * * * *